United States Patent [19]

Bratton et al.

[11] Patent Number: 4,740,227
[45] Date of Patent: Apr. 26, 1988

[54] GOB DISTRIBUTOR

[75] Inventors: Kenneth L. Bratton, Windsor; Richard W. Cronkhite, New Britain, both of Conn.

[73] Assignee: Emhart Industries, Inc., Farmington, Conn.

[21] Appl. No.: 18,220

[22] Filed: Feb. 24, 1987

[51] Int. Cl.[4] .............................................. C03B 7/08
[52] U.S. Cl. ......................................... 65/164; 65/163; 65/171; 65/172; 65/225
[58] Field of Search ................. 65/159, 164, 165, 171, 65/225, 304, 163, 172, 173, 207

[56] References Cited

U.S. PATENT DOCUMENTS 4,445,923 5/1984 Shetterly ........................... 65/164 X
4,599,101 7/1986 Douglas et al. .................. 65/225 X Primary Examiner—Arthur Kellogg
Attorney, Agent, or Firm—Spencer T. Smith

[57] ABSTRACT

A gob distributor is disclosed wherein the displacement of the gob scoops is controlled by positioned data generated by a linear displacement transducer. The transducer has an elongated tube having a free end and a screw section at the other end of the tube. The screw section is secured into a mounting bracket aperture which is secured to the drive housing. The tube (and screw portion) passes freely through an enlarged bore in the housing and the tube passes through a movable sensing head and its free end is releasably secured by a spring clamp supported by the drive housing.

2 Claims, 3 Drawing Sheets

GOB DISTRIBUTOR

The present invention relates to mechanisms for distributing glass gobs from a gob feeder to discrete glassware forming stations.

Gob distributors include a head which usually includes a plurality of gob scoops rotatively displaceable to precise locations by a ball screw assembly. Positional accuracy is achieved by mounting the magnetic sensing head of a linear displacement transducer assembly on the carriage for the ball screw nut and permanently clamping the free end of the probe of the transducer to a ball screw housing bracket (see U.S. Pat. No. 4,599,101 for details of such an arrangement). Positional information generated by the transducer can be used to precisely control the servo drive for the ball screw.

It is an object of the present invention to improve this transducer assembly.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings.

Figure 2:
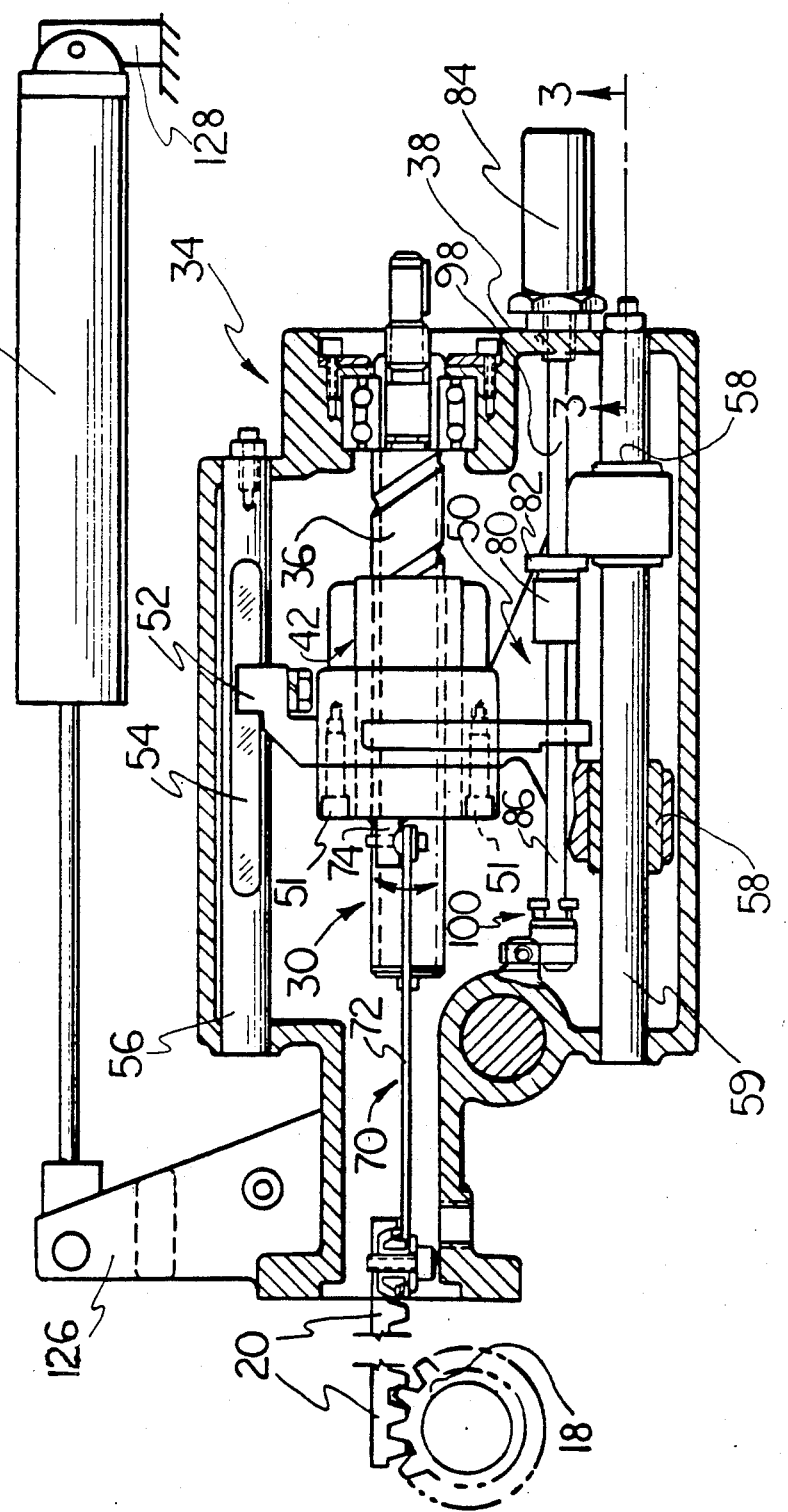
FIG. 2 is a view looking downwardly into the lower casting of the ball screw housing.

The gob distributor includes a head 10 which has a housing 12 supporting a number of gob scoops 14. These scoops 14 receive and redirect gobs to a fixed array of throughs (not shown) which feed discrete glassware forming stations. The housing also supports a corresponding number of gob receiving ends 16 which receive gobs from a gob feeder and guide these gobs to the scoops 14. As illustrated in FIG. 2, each gob scoop 14 has a pinion 18 which interconnects with a rack 20 so that the gob scoops can be rotatively displaced in unison through a desired angular range by selective displacement of the rack.

Figure 1:
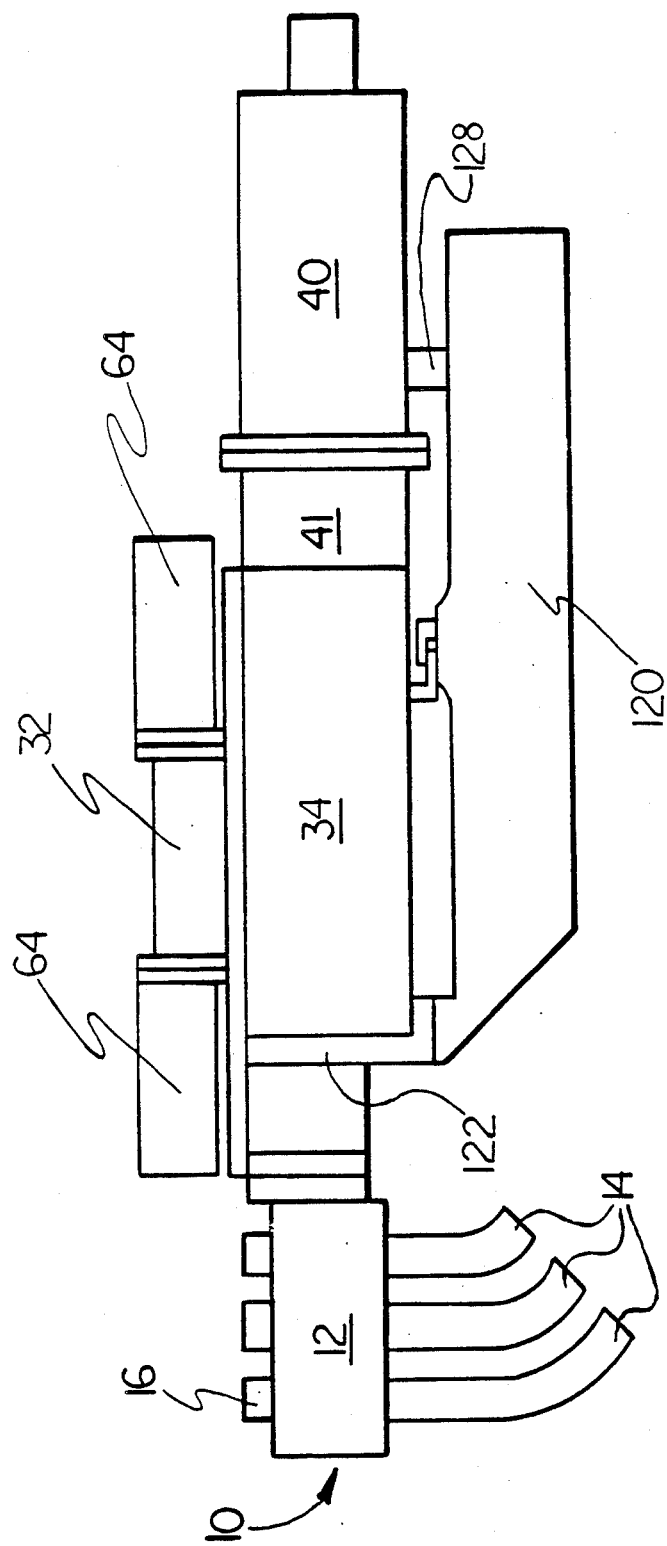
FIG. 1 is a side elevational view of a gob distributor made in accordance with the teachings of the present invention.

The displacement of the rack is controlled by a ball screw assembly 30 (FIG. 2) which is contained within a housing having upper 32 and lower 34 parts (FIG. 1). As shown in FIG. 2, a ball screw 36 is journalled into the right end wall 38 of the lower housing 34. Rotation of the ball screw 36 by a servo motor 40 via a coupling 41, advances or retracts a ball screw nut 42. To maintain this ball screw nut 42 at its desired orientation throughout its displacement a carriage 50 is secured to the ball screw nut 42 via bolts 51. The carriage 50 extends towards one side of the lower housing 34 and rotatably supports upper 52 and lower (not shown) rollers which ride on flats 54 (only the top flat is shown) defined on a support rod 56 extending between the ends of the lower housing 34. The carriage 50 also extends toward the other side of the lower housing 34 and supports a pair of axially spaced cylindrical bushings 58 which slide along a second rod 59. This rod 59 extends, parallel to the first rod 56, between the ends of the lower housing 34.

The ball screw nut 42 is connected via a coupling 70 to the rack 20. The coupling includes a link 72 which is secured at its right end to nut brackets 74 and which is secured at its other end to the rack 20.

Figure 3:
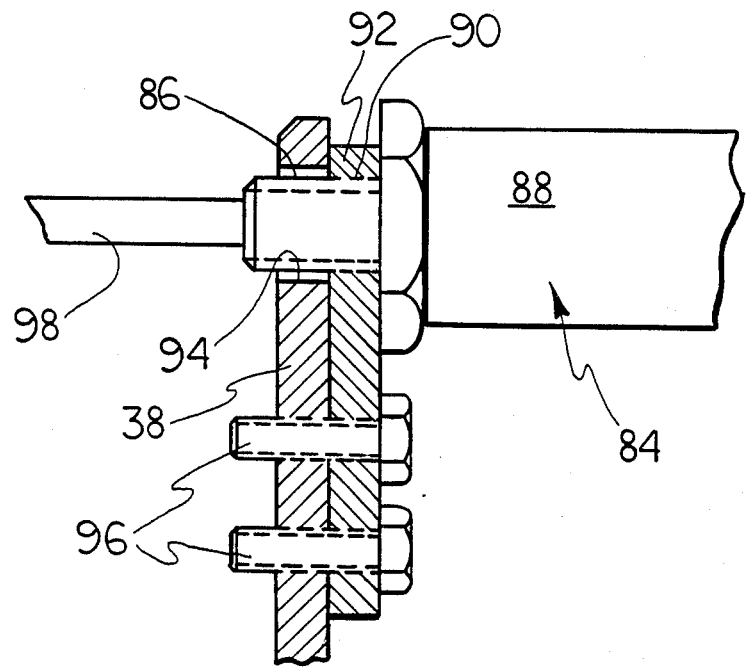
FIG. 3 is a view taken at 3—3 of FIG. 2.
Figure 4:
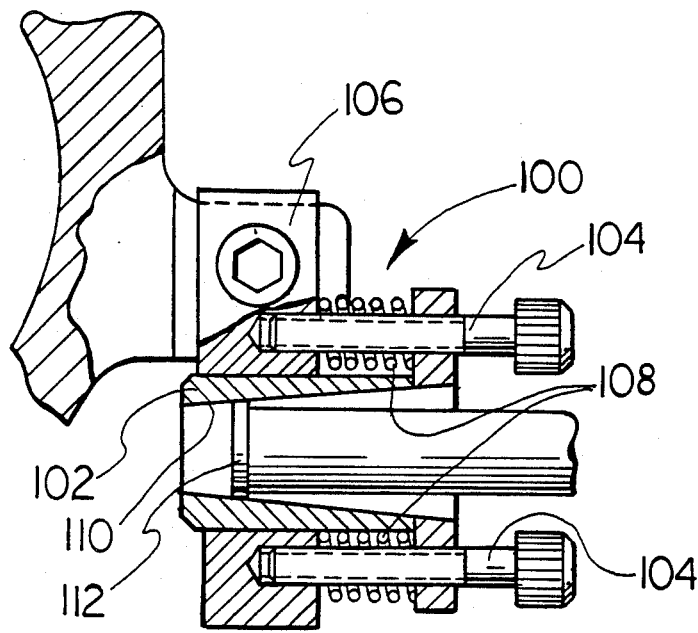
FIG. 4 is an enlarged view of the transducer clamping assembly illustrated in FIG. 2.

Secured to the carriage 50 is the magnetic sensing head 82 of a linear displacement transducer 84. The transducer 84 has a screw section 86 (FIG. 3) adjacent to its head 88 which is received by a threaded aperture 90 of a mounting bracket 92 and the screw section which extends beyond the mounting bracket 92 passes freely through the transducer bore 94 in the lower housing. The mounting bracket 92 is secured to the end wall 38 by a pair of bolts 96. The linear transducer tube 98 is accordingly inserted into the transducer aperture 94 in the lower housing end wall 38 and is pushed into a spring clamp 100 (FIG. 4) which is mounted on the lower housing. This spring clamp 100 includes a clamp 102 which is movable along a pair of vertically spaced guide bolts 104 which are secured to the clamp bracket 106. Springs 108 located around these guide bolts 104 between the bracket 106 and the clamp 102 urge the clamp 102 towards a position against the heads of the guide bolts. The clamp has a tapered thru-bore 110 which will limit the insertion of the tube tip 112. Further advancement of the tube pushes the clamp 102 against the spring 108 to a clamp position shown in FIG. 3.

The ball screw housing is supported by a support bracket 120 for pivotal movement about a vertical shaft 122 and the entire gob distributor including the head 10, ball screw assembly 30 and the drive motor 40 and coupling 41, can be pivoted from an operative position to a remote position by operating the retract cylinder 124 which extends between a support bracket arm 128 and a lower housing arm 126.

We claim:

1. A gob distributor comprising:
    a head including at least one gob scoop having a pinion and rack means for interconnecting with said pinion so that said gob scoop can be rotatively displaced through a predetermined angular range by the displacement of said rack means,
    means for displacing said rack means including:
        a ball screw,
        a ball screw nut,
        a ball screw housing,
        carriage means secured to said ball screw nut, and
        means secured to said ball screw housing for guiding the displacement of said carriage means,
    means for generating positional data relative to the position of said ball screw nut including:
        a linear displacement transducer having a magnetic sensing head and a generator having an elongated tube having a free end,
        first bracket means for securing said magnetic sensing head on said carriage means,
        spring clamp means secured to said housing for releasably clamping the free end of said elongated tube including
            a clamp having a tapered thru-bore,
            guide bolt means secured to said ball screw housing for guiding the displacement of said clamp, and
            spring means around said guide bolt means and compressively located between said clamp and said housing,
        said transducer including a threaded section at the opposite end of said elongated tube,
        second bracket means including a threaded bore for receiving said threaded section, and means for securing said second bracket to said housing when said free end is clamped by said spring clamp means, said housing having a thru-bore selectively sized to permit the free passage of said threaded section as said second bracket is secured to said housing.

2. A gob distributor according to claim 1, wherein said housing includes a mounting bracket having a first thru-bore for receiving said clamp means and second and third bores for receiving said guide bolts.

* * * * *